Patented Nov. 2, 1937

2,098,209

UNITED STATES PATENT OFFICE 2,098,209

PROCESS FOR TREATING LETTUCE IN PACKING AND SHIPPING

Joseph H. Grande, Salinas, Calif.

No Drawing. Application June 7, 1937,
Serial No. 146,959

5 Claims. (Cl. 99—193)

The present invention relates to a process for treating lettuce for preserving it for shipping.

It is well known that when lettuce is subjected to cold temperatures it discolors, particularly at the butt end or stalk portion of the head as well as the leaves and at any places where they become split or bruised; it is also well known that when lettuce is contacted with ice, it becomes what is known as "ice burned", all of which renders the lettuce objectionable for sales purposes, resulting in waste and other economic loss.

It has been found that when lettuce is treated by the process of the invention, discoloration is eliminated or reduced to a minimum and ice burns are also avoided. Therefore the present invention is of great utility to growers and packers of lettuce in the shipment of the same.

In carrying out the invention, lettuce is treated by applying thereto in any convenient manner, particularly to the butts and stalk portions thereof, and whenever desirable to the leaves, an edible, non-toxic acidic substance, preferably an acidic substance capable of existing in crystallizable form under ordinary temperatures. The lettuce may be then packed for shipping in the usual manner in crushed ice, usually crushed to a snow-like condition. The ice may have the edible, non-toxic acidic substance incorporated in it, preferably acid sodium citrate.

The edible, non-toxic acidic substance may be made up from citrate acid crystals, dissolved in water in proportions of 1 pound of citrate acid crystals to 10 gallons of water. These proportions may be varied within wide limits. The solution is applied in any desirable manner to the lettuce at normal temperatures, preferably by dipping or spraying.

The ice in which the lettuce may be packed is made by dissolving in the water, from which the ice is made, the citrate acid crystals, for example in the proportion of 2 to 3 pounds, more or less, of such crystals for each ice can (the contents of which is usually for making 300 pounds of ice). The crystals may be dissolved in the water before it is placed in the cans or they may be placed in the ice cans to which the water is later added or, conversely, sufficient stirring being applied to mix the dissolved crystals with the water. Ice so formed is then crushed, preferably to a snow-like condition, and is used for packing in or around boxes or crates of lettuce or in cars or other storage vessels in which the lettuce is shipped.

Specific examples of crystalline edible non-toxic substances comprised within my invention are mono-sodium citrate, di-sodium-citrate, citric acid, soluble acid, salts of lactic acid, tartaric acid, soluble acid salts of tartaric acid, soluble crystalline salts or citrate acid of tartaric acid and the like.

From the foregoing it will be understood that the method of my invention contemplates the packing of lettuce in suitable containers for storage and shipment, either under normal conditions of temperatures or under relatively low refrigerating temperatures as in ice packs, the lettuce having been treated by contacting it with an edible, non-toxic acidic substance, and for this purpose I prefer to employ a crystalline acidic substance possessing these properties, because they are more convenient for handling and for making up the solution to be applied to the lettuce or for making up the ice in which the acidic substance is incorporated.

Lettuce thus treated has been found to stay for long periods of time without showing indication of discoloration or withering or the effects of ice burns, but on the contrary is bleached to a desirable condition which renders it quite acceptable on the market.

Having thus described by invention in its preferred form it is to be understood that I am not limiting it to such proportions and ingredients given as there may be variations and modifications in proportions and equivalent substances used which fall within the scope of the appended claims.

That which is claimed is:

1. A process for preventing discoloration of lettuce during packing and shipping which includes contacting the lettuce with an edible, non-toxic acidic substance prior to packing and shipping the said edible, non-toxic acidic substance being selected from the group which consists of mono-sodium-citrate, di-sodium-citrate, citric acid, soluble acid salts of lactic acid, tartaric acid and soluble acid salts of tartaric acid.

2. A process for packing and shipping lettuce to prevent discoloration, which comprises subjecting the lettuce to the action of an edible, non-toxic acidic substance while in storage or shipment, said edible non-toxic acidic substance being selected from the group consisting of mono-sodium-citrate, di-sodium-citrate, citric acid, soluble acid salts of lactic acid, tartaric acid and soluble acid salts of tartaric acid.

3. A process for treating lettuce for packing and shipment to prevent discoloration and ice burn thereof, and for bleaching the same, which comprises contacting the lettuce with a solution of an acid citrate salt and packing said lettuce in ice containing an acid citrate salt.

4. A process for treating lettuce for packing and shipment to prevent discoloration and ice burn thereof and for bleaching the same, which includes packing lettuce in ice containing an acid citrate salt.

5. A process for treating lettuce for packing and shipment to prevent discoloration and ice burn thereof and for bleaching the same, which comprises contacting the lettuce with a solution of an acid citrate salt in the proportions of substantially one pound of said salt to ten gallons of water, and packing said lettuce in ice containing an acid citrate salt in the proportions of approximately one part said salt to one hundred parts of water.

JOSEPH H. GRANDE.